United States Patent Office 3,606,730
Patented Sept. 21, 1971

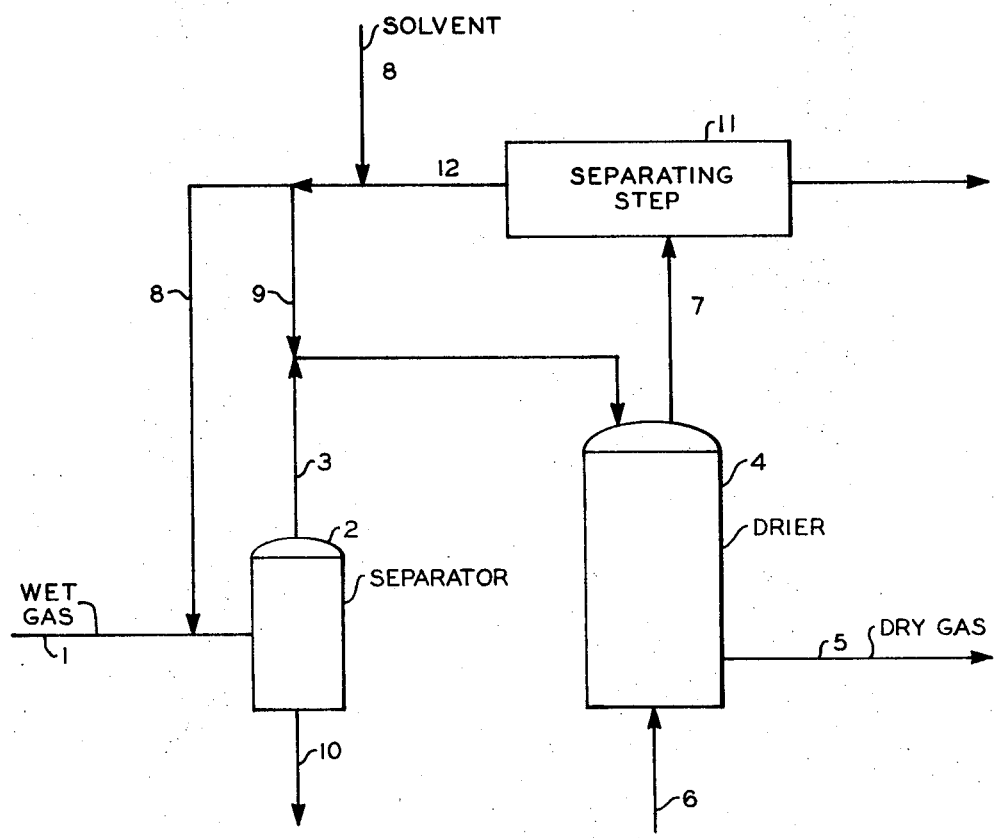

3,606,730
REMOVAL OF DEPOSITS FROM SOLID DESIC-
CANT-CONTAINING DEHYDRATORS
William C. Clark and Tommy R. Miller, Sweeny, Tex.,
assignors to Phillips Petroleum Company
Filed Oct. 29, 1969, Ser. No. 872,197
Int. Cl. B01d 53/02
U.S. Cl. 55—33                                      7 Claims

ABSTRACT OF THE DISCLOSURE

Deposits which occur in desiccant beds used to dehydrate gases containing depositable material or polymerizable constituents are removed by adding with the gases passing to the desiccant bed a solvent for the depositable material so as to adsorb in the desiccant at least a portion of the solvent which upon regeneration of the desiccant bed leaves the bed together with the depositable material as when the bed is regenerated with hot regenerated gases. In one embodiment an unsaturated hydrocarbon-containing gas, e.g., an ethylene-containing gas, resulting from the pyrolytic conversion of a saturated hydrocarbon such as ethane or propane, is passed, at least for a portion of the time it is being dehydrated, together with an aromatic solvent, for example, benzene or toluene, into the desiccant bed. The flow of solvent need not be continuous. In another embodiment solvent is placed upon the desiccant bed before the gases are passed thereto so that solvent will be present as the depositable material coats onto the desiccant. In the case of polymerizable material which will polymerize and harden during the heated regeneration cycle, the solvent aids in the removal of the depositable material and the solvent can be recovered therefrom for reuse. In a modification at least a portion of the solvent is intermingled with the gas feed and the mixture passed to a separation zone for separation of liquid. This further prolongs the useful life and efficiency of the desiccant.

---

This invention relates to the removal of deposits from a dehydration zone containing a solid desiccant. In one of its aspects it relates to the use of a solvent for the removal of a deposited material which will harden in the bed or desiccant during regeneration thereof with a hot regeneration gas. In another of its aspects the invention relates to a dehydration of an unsaturated hydrocarbon-gas-containing stream, e.g., ethylene, propylene, etc.

In one of its concepts the invention provides a method for the removal from a desiccant bed of materials which tend to deposit in said bed and harden thereon during regeneration, as with hot gases, which comprise introducing with the gas to be dried a solvent for said material which will be adsorbed into said bed together with moisture removed thereby from the gas; upon heating of the bed without regeneration gases the solvent and depositable material which has been deposited will be readily removed. In another of its concepts the invention provides a method as described wherein at least a portion of the solvent is admixed with the gases before these enter the desiccant-containing zone and the mixture of solvent and gases is subjected to a liquid knockout or dropout operation thereby avoiding entry into the desiccant bed of at least a portion of the depositable material.

In the dehydration of gases solid desiccant bed dryers or dehydrators are known. In some operations, as when dehydrating a gas containing a depositable or polymerizable material, the desiccant bed is all too soon piled up with deposit which accumulates therein and hardens, especially when the bed is at an elevated temperature, as when it is being regenerated with hot regeneration gases.

We have now conceived of a method for avoiding hardened deposits in desiccant beds, for example, in alumina or molecular sieve dehydration beds, by adding to said beds, directly or indirectly, as with the feed of gases being fed thereto for dehydration, a solvent for the material which tends to deposit and harden in said bed. The solvent is so selected that it will deposit in the bed and remain there substantially during the entire time that gases are being dehydrated thereby. Upon discontinuing the flow of gases to be dehydrated and starting a flow of hot regeneration gases, the solvent and deposited material or materials can be driven from the bed.

In one operation in the plant in which dehydrators are subjected to fouling due to polymer formation during the process and/or the regeneration cycle, the dehydrators being employed to dehydrate ethylene-containing gas obtained from the pyrolytic conversion of a saturated hydrocarbon such as ethane or propane, the stream time of the dehydrators, indeed, of the desiccant life has been considerably increased by the injection of an aromatic hydrocarbon, e.g., toluene, into the feed of the dehydrators. This injection was made by a small continuous flow of about one to two barrels per hour for five to six hours prior to the end of the process cycle and also by way of a slug flow of five to six barrels prior to the end of the process cycle. It is also possible to put in at least some of the solvent onto the desiccant before employing it for dehydration of gas. Further, by admixing some of the solvent with the incoming gases and subjecting the mixture to a liquid-gas separation the liquid will take with it a good portion of the depositable material or polymer-forming constituent so that the effective life and efficiency of the dehydrating bed is considerably increased.

It is an object of this invention to dehydrate a gas. It is a further object of this invention to protect against the formation of hardened deposits therein a desiccant-material-containing bed. It is another object of the invention to increase the efficiency and life span of a dehydrating bed.

Other aspects, concepts, objects and the several advantages of the invention are apparent from a study of this disclosure, the drawing and the appended claims.

According to the present invention there is injected together with a gas to be dehydrated therein a solvent into a desiccant bed, the solvent being so selected that it remains in the desiccant bed while the gases emanate therefrom. The solvent can be coated, at least in part, on the desiccant bed before the flow of gases, during the flow of gases or just prior to ending the flow of gases. The manner of operation selected will, of course, depend upon the nature of the gases treated and the depositable material therein.

In one operation to which the invention is particularly suited 72.8 MM.s.c.f.d. of an ethylene-containing gas are dehydrated employing an alumina and mole sieve desiccant. The dryer is 10 feet in diameter and has an upper bed 2 feet deep of activated alumina and a lower bed 12.5 feet deep of Linde 3A molecular sieve. The pressure in the treatment is 187 p.s.i.g., and temperature is 50° F. The onstream time of the desiccant prior to use of the invention was 12 hours. After applying the present invention to the operation, the effective life of the desiccant was increased to 20 hours. Further, the efficiency of the desiccant over its life was maintained at a normal rate. The specific solvent used was heavy Platformate having the following composition:

| | |
|---|---|
| Benzene | 0.1 |
| Isoheptanes | 6.2 |
| Dimethyl cyclopentane | 6.1 |
| Normal heptane | 7.9 |
| Toluene | 47.2 |
| Isooctanes | 13.6 |
| Normal octane | 3.1 |
| $C_8$ aromatics | 20.8 |
| | 100.0 |

The drawing shows diagrammatically the principal steps of the method of the invention.

Referring now to the drawing, a gas feed having the following composition containing ethylene

| | |
|---|---|
| Carbon monoxide | 0.29 |
| Carbon dioxide | 0.00 |
| Hydrogen | 28.83 |
| Methane | 10.38 |
| Acetylene | 0.28 |
| Ethylene | 34.34 |
| Ethane | 24.38 |
| Propylene | 0.65 |
| Propane | 0.23 |
| Butadienes | 0.23 |
| Butylenes | 0.23 |
| $C_3+$ and oils | 0.16 |
| Sum | 100.00 | obtained by pyrolysis at a temperature of the order of about 1500° F. of a stream having a composition approximated by the following

| | |
|---|---|
| Hydrogen | 0.0 |
| Methane | 1.900 |
| Ethylene | 0.0 |
| Ethane | 96.500 |
| Acetylene | 0.0 |
| Propylene | 1.300 |
| Propane | 0.300 |
| Butene | 0.0 |
| Butadiene | 0.0 |
| N-butane | 0.0 |
| Sum | 100.000 | is passed by 1 into gas-liquid separator 2 and by 3 to solid-desiccant containing dryer 4 from which dried gas is removed at 5. Periodically, the flow described is discontinued, whereupon hot regeneration gas is passed by 6 into dryer 4 and removed therefrom at 7.

According to the invention to avoid the formation of the hardened deposit a solvent is introduced by 8 into line 1 and/or into line 9 and from line 9 into 3. To the extent solvent is introduced to line 1, it will commingle with the gases to be dehydrated and will take therefrom some of the depositable material which otherwise would deposit in dryer 4. This depositable material and solvent are removed at 10. At least a portion of the solvent is passed through 9 by way of 3 into dryer 4. As earlier noted, some of the solvent can be placed upon the desiccant in the bed prior to passing the gases, during the passing of the gases or sometime just prior to discontinuing their flow. This will depend upon the kind of deposits being formed and how long it can be allowed to form, yet still obtain effective removal thereof upon regeneration which follows the dehydration cycle.

During regeneration the deposited materials and the hot regeneration gases carrying the same, together with the solvent now removed from the desiccant, are passed to separating step 11 from which solvent is obtained for reuse and return by 12.

The pyrolysis of saturated hydrocarbons to produce unsaturated hydrocarbons, for example, ethylene, propylene, butene, etc., is well known. The conditions for such operations are known in the art. It is known that the pyrolysis results in certain compounds such as butene, butadiene, and other unsaturated materials which tend to polymerize when heated. It is with such materials that one must deal in the dehydration of such gases.

Desiccants which can be used in lieu of those already mentioned are: activated alumina, molecular sieves, bauxite, silica gel and the like.

Solvents which can be used include such as benzene, toluene, xylenes, cracked gasolines, reformed gasoline (Platformate), and other aromatic solvents.

It will be evident to one skilled in the art that the general modus operandi of using a solvent which will dissolve the depositable material which hardens on the desiccant material during its regeneration, or prior thereto, is applicable to dehydration of a wide variety of materials, gases or vapors, a concept basic to the invention being in the placing upon the desiccant the solvent for the depositable material or for the hardened material which tends to form. Another concept basic to the invention is found in the a priori laying down on the desiccant, as it were, of the solvent. A further concept basic to the invention is in the commingling of solvent and incoming gases followed by a liquid separation in which, in effect, the desiccant is guarded against receiving in the first place the depositable material.

Reasonable variation and modification are possible within the scope of the foregoing disclosure, the drawing and the appended claims to the invention the essence of which is that a solvent is used to prolong the life and to increase the efficiency of a desiccant in a dehydration zone by adding the solvent to said zone, in one modification adding at least a portion of the solvent to the incoming gases to be dehydrated in said zone and separating a liquid portion from said gases substantially as described; further, that the solvent can be added to the bed prior to entry of gases, after entry of some gases, together with the gases or just prior to terminating a dehydration cycle.

We claim:

1. A method for the operation of a desiccant bed used to dry gases which tend to deposit in said bed material which will harden thereon during regeneration of said bed by heating the same which comprises introducing with the gas to be dried a solvent for said material which will be adsorbed into said bed together with moisture removed thereby from the gas so that upon the heating of the bed said solvent will be removed together with said material thereby preventing formation of a hardened deposit upon said bed to increase the effective life as well as efficiency of the desiccant.

2. A method according to claim 1 wherein the solvent is introduced, at least in part, to the bed prior to passing gas to be dehydrated to said bed to lay down in the interstices of the bed solvent which will prevent hardening of deposited material during the drying of the gases and, therefore, aid in the removal of said deposits during ensuing regeneration of the desiccant.

3. A method according to claim 1 wherein there is introduced into the gases to be dried a solvent for said material, the gases are passed through a liquid separating zone and at least a portion of said solvent and said material carried thereby is removed from the gases prior to their entry into the desiccant.

4. A method according to claim 1 wherein the desiccant is heated to regenerate the same, the vaporized solvent and water vapor, including deposit removed from the bed, are passed into a separation zone from which the solvent is recovered for reuse.

5. A method according to claim 1 wherein the gases are unsaturated gases derived from the cracking petroleum or a fraction thereof.

6. A method according to claim 5 wherein the gases are ethylene-containing and are derived from the pyrolytic conversion of a hydrocarbon such as ethane or propane.

7. A method according to claim 1 wherein the solvent is an aromatic solvent such as benzene, toluene, xylene or a cracked gasoline.

References Cited

UNITED STATES PATENTS

| | | | |
|---|---|---|---|
| 3,242,641 | 3/1966 | Makin, Jr. | 55—33 |
| 3,304,693 | 2/1967 | Ebrey | 55—74X |
| 3,352,840 | 11/1967 | Oktaz | 260—94.7 |

REUBEN FRIEDMAN, Primary Examiner

R. W. BURKS, Assistant Examiner